US012662966B2

(12) United States Patent
Howarth et al.

(10) Patent No.: US 12,662,966 B2
(45) Date of Patent: Jun. 23, 2026

(54) LIGHTOFF FUEL PRESSURE REDUCTION SYSTEM

(71) Applicant: Solar Turbines Incorporated, San Diego, CA (US)

(72) Inventors: David W. Howarth, La Mesa, CA (US); Kiara Breadmore, San Diego, CA (US); Terry R. Tarver, Saratoga Springs, UT (US); John S. Bowen, San Diego, CA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/374,975

(22) Filed: Sep. 29, 2023

(65) Prior Publication Data

US 2025/0109710 A1     Apr. 3, 2025

(51) Int. Cl.
*F02C 7/264*     (2006.01)
*F02C 7/228*     (2006.01)
*F02C 7/232*     (2006.01)

(52) U.S. Cl.
CPC .............. *F02C 7/264* (2013.01); *F02C 7/228* (2013.01); *F02C 7/232* (2013.01); *F05D 2260/85* (2013.01)

(58) Field of Classification Search
CPC .. F02C 7/232; F02C 9/263; F02C 9/26; F02C 9/28; F02C 9/32; F02C 9/48; F05D 2260/85
See application file for complete search history.

(56) References Cited

U.S. PATENT DOCUMENTS

| | | | | |
|---|---|---|---|---|
| 2,725,932 | A | * 12/1955 | Ballantyne | ................ F02C 7/22 |
| | | | | 137/98 |
| 4,493,187 | A | * 1/1985 | Hansen | .................... F01D 21/18 |
| | | | | 60/39.281 |
| 4,894,988 | A | * 1/1990 | Hoppenjans | ........... H01H 33/34 |
| | | | | 307/112 |
| 10,830,156 | B2 | 11/2020 | Cano et al. | |
| 11,242,807 | B2 | 2/2022 | Beckmann et al. | |
| 2004/0079071 | A1* | 4/2004 | Rehn | ....................... F02C 9/266 |
| | | | | 60/39.465 |

(Continued)

FOREIGN PATENT DOCUMENTS

| | | |
|---|---|---|
| FR | 2913250 A1 | 9/2008 |
| JP | H10288098 A | 10/1998 |
| JP | 2000356168 A | 12/2000 |

OTHER PUBLICATIONS

Written Opinion and International Search Report for Int'l. Patent Appln. No. PCT/US2024/042375 , mailed Dec. 4, 2024 (12 pgs).

*Primary Examiner* — Phutthiwat Wongwian
*Assistant Examiner* — Roberto Toshiharu Igue

(57) ABSTRACT

Traditionally, during ignition of a gas turbine engine, the fuel control valves are controlled to be nearly closed, in order to provide the small amount of fuel that is necessary to ignite the gas turbine engine. The error that is inherent in providing fuel flow through small openings results in a higher likelihood of start-up failures. Accordingly, a lightoff fuel pressure reduction system is disclosed that uses a pressure reducing regulator on a bypass flow path to temporarily reduce the pressure of fuel supplied to the fuel control valves. In this case, the fuel control valves may be maintained in a more open position during the ignition phase, which reduces the likelihood of ignition failures.

20 Claims, 6 Drawing Sheets

(56)        References Cited

U.S. PATENT DOCUMENTS

| | | | |
|---|---|---|---|
| 2008/0260519 A1* | 10/2008 | Dooley | F23K 5/06 |
| | | | 415/118 |
| 2009/0313966 A1* | 12/2009 | Vanderleest | F02C 9/263 |
| | | | 73/112.01 |
| 2015/0107217 A1* | 4/2015 | Tapie | F23K 5/002 |
| | | | 60/779 |
| 2017/0074174 A1 | 3/2017 | D'Alessandro et al. | |
| 2021/0277834 A1* | 9/2021 | Culwick | F02C 7/222 |
| 2022/0099050 A1 | 3/2022 | Tyler et al. | |

* cited by examiner

200

High Pressure
210
220
225
230
215A
240A
250A1
250A2
205
Ignition Pressure
215B
240B
250B
215C

200

High Pressure
210
220
225
230
215A
240A
250A1
250A2
205
High Pressure
215B
240B
250B
215C

LIGHTOFF FUEL PRESSURE REDUCTION SYSTEM

TECHNICAL FIELD

The embodiments described herein are generally directed to gas turbine engines, and, more particularly, to a fuel pressure reduction system for lightoff in a gas turbine engine.

BACKGROUND

For reliable operation, a gas turbine engine requires a range of fuel flow, from the lowest fuel flow at ignition to the highest fuel flow at full output power. The ratio of the fuel flow required for full power to the fuel flow required for ignition can be on the order of 120:1 or greater. Typically, the operator of a gas turbine engine will simply set the facility's fuel pressure supply regulator to the level required to operate the gas turbine engine at full output power. In this case, the fuel control valves are used to modulate the fuel pressure, as supplied by the facility, to the level required for the various operational conditions.

This means that, during ignition, the fuel control valves must be controlled to be nearly closed, in order to provide the small amount of fuel necessary to ignite the gas turbine engine. However, there is a much higher error in metering fuel flow when supplying fuel through a small opening (e.g., potentially up to approximately 50% error) than when supplying fuel through a large opening (e.g., approximately 5% error). Thus, it is difficult to accurately control the amount of fuel supplied to the gas turbine engine during ignition.

This lack of accuracy can result in significant uncertainty in the amount of fuel that is delivered at ignition, which, in turn, may produce more failures in start events for the gas turbine engine. For example, if the fuel flow is too low, the gas turbine engine may not start. Similarly, if the fuel flow is too rich, the gas turbine engine may not start.

Japanese Patent Publication No. JPH10288098A, published Oct. 27, 1998, describes a bypass pipe with a pressure regulator that adjusts the pressure of the fuel within a predetermined range, while a gas control valve on the main pipe is closed, when a gas engine is started. Japanese Patent Publication No. JP2000356168A, published on Dec. 26, 2000, describes a similar feature. The present disclosure is directed toward overcoming one or more of the problems discovered by the inventors.

SUMMARY

In an embodiment, a system comprises: a lightoff fuel pressure reduction system (LFPRS) valve on a main flow path, between an inlet and one or more fuel control valves that supply fuel to one or more fuel injectors, wherein the LFPRS valve is configured to switch between an open state, in which fuel can flow downstream through the LFPRS valve, and a closed state in which fuel cannot flow downstream through the LFPRS valve; a pressure reducing regulator, connected in parallel to the LFPRS valve, on a bypass flow path between the inlet and the one or more fuel control valves, wherein the pressure reducing regulator is configured to reduce a fuel pressure of fuel flowing through the pressure reducing regulator; and a vent between the LFPRS valve and the one or more fuel control valves.

In an embodiment, a system comprises: an inlet; one or more fuel control valves that supply fuel to one or more fuel injectors; a lightoff fuel pressure reduction system (LFPRS) valve on a main flow path, between the inlet and the one or more fuel control valves, wherein the LFPRS valve is configured to switch between an open state, in which fuel can flow downstream through the LFPRS valve, and a closed state in which fuel cannot flow downstream through the LFPRS valve; a pressure reducing regulator, connected in parallel to the LFPRS valve, on a bypass flow path between the inlet and the one or more fuel control valves, wherein the pressure reducing regulator is configured to reduce a fuel pressure of fuel flowing through the pressure reducing regulator; a vent between the LFPRS valve and the one or more fuel control valves; and one or more fuel shutoff valves between the vent and the one or more fuel control valves, wherein each of the one or more fuel shutoff valves is configured to switch between an open state, in which fuel can flow downstream through the fuel shutoff valve, and a closed state in which fuel cannot flow downstream through the fuel shutoff valve.

A method of starting a gas turbine engine, the method comprising, during an ignition phase: shutting a lightoff fuel pressure reduction system (LFPRS) valve on a main flow path between an inlet and one or more fuel control valves that supply fuel to one or more fuel injectors in a combustor of the gas turbine engine, wherein the LFPRS valve is connected in parallel to a pressure reducing regulator on a bypass flow path between the inlet and the one or more fuel control valves, and wherein the pressure reducing regulator reduces pressure in a portion of the main flow path that is downstream from the LFPRS valve to an ignition pressure; venting the portion of the main flow path that is downstream from the LFPRS valve; opening the one or more fuel control valves; and igniting a combustion process in the combustor using the one or more fuel injectors.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
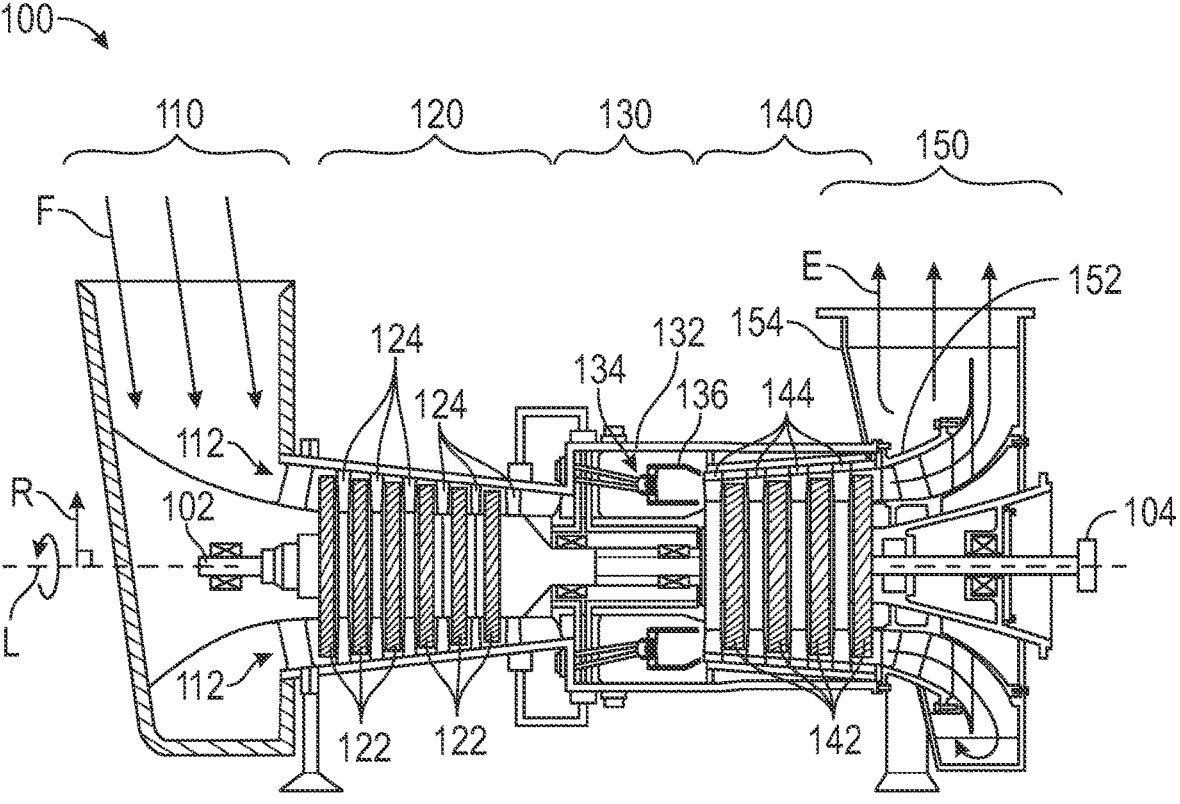
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

References herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground). In addition, the terms "respective" and "respectively" signify an association between members of a group of first components and members of a group of second components. For example, the phrase "each component A connected to a respective component B" would signify A1 connected to B1, A2 connected to B 2, . . . and AN connected to BN.

It should also be understood that the various components illustrated herein are not necessarily drawn to scale. In other words, the features disclosed in various embodiments may be implemented using different relative dimensions within and between components than those illustrated in the drawings.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer to or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
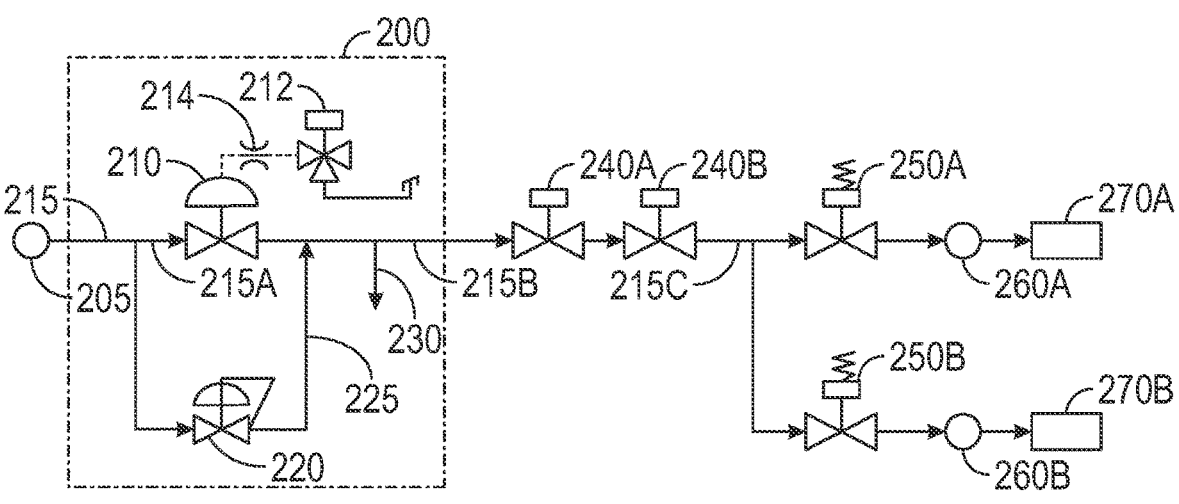
FIG. 2 illustrates a schematic of a system that utilizes lightoff fuel pressure reduction, according to an embodiment.

FIG. 2 illustrates a schematic of a system that utilizes lightoff fuel pressure reduction (LFPRS), according to an embodiment. In the illustrated embodiment, lightoff fuel pressure reduction system 200 is supplied with fuel via an inlet 205, and comprises an LFPRS valve 210 on a main flow path 215, a pressure reducing regulator 220 on a bypass flow path 225, and a vent 230. Downstream from lightoff fuel pressure reduction system 200 are one or more fuel shutoff valves 240, illustrated as primary fuel shutoff valve 240A and secondary fuel shutoff valve 240B, and one or more fuel control valves 250, illustrated as a main fuel control valve 250A and pilot fuel control valve 250B. Each fuel control valve 250 may control the flow of fuel to a manifold 260, illustrated as main manifold 260A and pilot manifold 260B, which provides one or more fuel paths to a port 270, illustrated as main port 270A and pilot port 270B, of one or more fuel injectors 134. It should be understood that the system that includes lightoff fuel pressure reduction system 200 does not have to comprise all of these components, and may instead comprise fewer, more, or different components than those illustrated.

Inlet 205 supplies fuel to main flow path 215. Inlet 205 may be connected to a fuel feed system of the skid for the gas turbine engine. The skid supplies the fuel to lightoff fuel pressure reduction system 200 at a first fuel pressure. The first fuel pressure into inlet 205 may be set high, such as in the range of 400 to 700 pounds per square in gauge (psig) (e.g., 575 psig). The first fuel pressure may represent the fuel pressure required or desired for operation of gas turbine engine 100 at full power. Thus, this first fuel pressure may be referred to herein as the "operational pressure."

LFPRS valve 210 is positioned along main flow path 215 between inlet 205 and fuel control valve(s) 250. For ease of explanation, main flow path 215 has been divided into segments 215A between inlet 205 and LFPRS valve 210, segment 215B between LFPRS valve 210 and fuel shutoff valve(s) 240, and segment 215C between fuel shutoff valve(s) 240 and fuel control valve(s) 250. LFPRS valve 210 may be configured to switch between a plurality of positions from a fully closed state, to each of a plurality of partially closed states or partially open states, to a fully open state. The range of the plurality of positions may be continuous or discrete. LFPRS valve 210 may be configured to gradually open from the fully closed state to the fully open state, under the control of a control system, based on one or more parameters (e.g., engine speed) of gas turbine engine 100.

LFPRS valve 210 may comprise a ball valve, within main flow path 215, that is actuated by a pilot-driven solenoid 212 with a valve timing orifice 214. Valve timing orifice 214 limits the speed at which the ball valve can move during transitions between the open and closed states. LFPRS valve 210 may be set as normally open. In this case, when solenoid 212 is de-energized, LFPRS valve 210 is in the open state, such that fuel can flow through LFPRS valve 210, and when solenoid 212 is energized, LFPRS valve 210 is in the closed state, such that fuel cannot flow through LFPRS valve 210. In an embodiment, when solenoid 212 is energized, the gas (e.g., air) may flow into valve timing orifice 214 to turn the ball valve ninety degrees (e.g., to the closed state).

Pressure reducing regulator 220 may be provided on a bypass flow path 225, such that pressure reducing regulator 220 is connected in parallel to LFPRS valve 210 on main flow path 215. Pressure reducing regulator 220 may be configured to reduce the fuel pressure of fuel flowing through pressure reducing regulator 220 and into the portion (e.g., comprising segments 215B and 215C) of main flow path 215 that is downstream from LFPRS valve 210. Pressure reducing regulator 220 may comprise a valve that controls the pressure of fuel, flowing out of bypass flow path 225, to a second fuel pressure. The second fuel pressure may be set lower than the operational pressure, such as in the range of 50 to 150 psig (e.g., 100 psig). The second fuel pressure may represent the fuel pressure required or desired for ignition of gas turbine engine 100. Thus, this second fuel pressure may be referred to herein as the "ignition pressure."

Main flow path 215 and bypass flow path 225 may have different diameters or the same diameter. For example, in a particular implementation, main flow path 215 had a diameter of 3 inches (7.62 centimeters), and bypass flow path 225 had a diameter of 1.5 inches (3.81 centimeters).

Vent 230 may be provided in segment 215B of main flow path 215, between LFPRS valve 210, as well as pressure reducing regulator 220, and fuel shutoff valve(s) 240. Vent 230 may comprise a valve that is switchable between an open state, in which fuel can flow through vent 230, and a closed state in which fuel cannot flow through vent 230. In the open state, fuel flows through vent 230, out of segment 215B. This reduces the fuel pressure in the portion of main flow path 215 that is downstream from LFPRS valve 210. In the closed state, fuel cannot flow through vent 230, and therefore, the fuel pressure in segment 215B of main flow path 215 is maintained. Vent 230 may be connected to a vent line that, for example, returns vented fuel to a fuel feed system or other destination.

Each fuel shutoff valve 240 may be configured to switch between an open state, in which fuel can flow downstream through fuel shutoff valve 230, and a closed state in which fuel cannot flow downstream through fuel shutoff valve 230. This enables main flow path 215 to be shut off, in accordance with applicable safety regulations and/or policies, by switching fuel shutoff valve 240 to the closed state. In the illustrated embodiment, a primary fuel shutoff valve 240A is connected in series with a secondary fuel shutoff valve 240B, for redundancy. Primary fuel shutoff valve 240A and secondary fuel shutoff valve 240B may be controlled by different actuation systems, such that they can be operated independently from each other, for added safety. Fuel shutoff valve(s) 240 may comprise any type of valve, such as a ball valve, any of the valves manufactured by Flowserve Corporation of Irving, Texas, or the like. Primary fuel shutoff valve 240A may be the same as or different than the type of valve used for secondary fuel shutoff valve 240B. In a particular embodiment, secondary fuel shutoff valve 240B may be the same type of valve as LFPRS valve 210 (e.g., ball valve).

In an embodiment, segment 215C of main flow path 215 branches into a plurality of flow paths to supply at least one main fuel control valve 250A and at least one pilot fuel control valve 250B. Main fuel control valve 250A controls the amount of fuel flowing to a main manifold 260A that is in fluid communication to at least one main port 270A of one or more fuel injectors 134. Similarly, pilot fuel control valve 250B controls the amount of fuel flowing to a pilot manifold 260B that is in fluid communication to at least one pilot port 270B of the one or more fuel injectors 134. Each main port 270A may be in fluid communication with one or more main fuel jets in fuel injector(s) 134 that are configured to inject main fuel for combustion in combustor 130, whereas each pilot port 270B may be in fluid communication with one or more pilot fuel jets in fuel injector(s) 134 that are configured to inject pilot fuel for igniting combustion in combustor 130. Each fuel control valve 250 may be configured to switch between a plurality of positions from a fully closed state, to each of a plurality of partially closed states or partially open states, to a fully open state. The range of the plurality of positions may be continuous or discrete.

Figure 3:
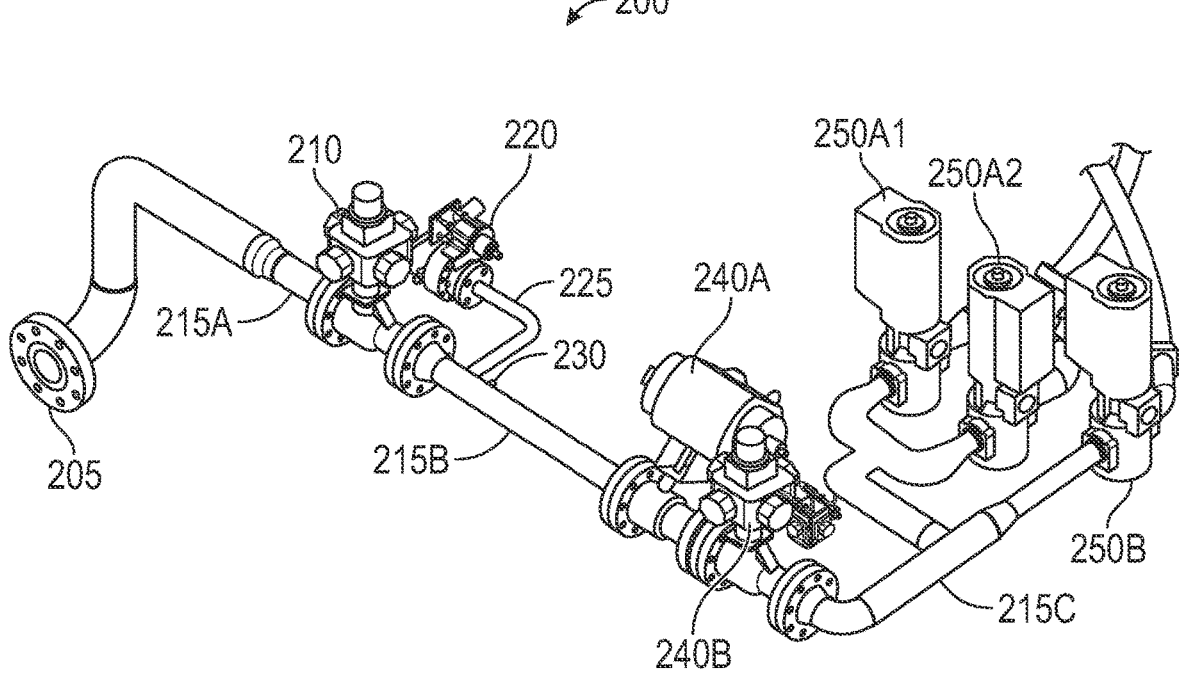
FIG. 3 illustrates a perspective view of a system that utilizes lightoff fuel pressure reduction, according to an embodiment.

FIG. 3 illustrates a perspective view of a system that utilizes lightoff fuel pressure reduction, according to an embodiment. In the illustrated embodiment, there are two main fuel control valves 250A1 and 250A2, and a single pilot fuel control valve 250B. The number of main fuel control valves 250A may depend on the design of each main fuel control valve 250A and the amount of fuel flow required to operate gas turbine engine 100. For example, if the design of lightoff fuel pressure reduction system 200 requires that main fuel control valve(s) 250 be capable of delivering X amount of fuel, and each main fuel control valve 250 is designed to deliver Y amount of fuel (Y≤X), then lightoff fuel pressure reduction system 200 may comprise at least X/Y main fuel control valves 250 (e.g., rounded up to the nearest integer, if necessary). It should be understood that the illustrated configuration of components is merely one, non-limiting example, and that many alternative configurations are possible.

Figure 4:
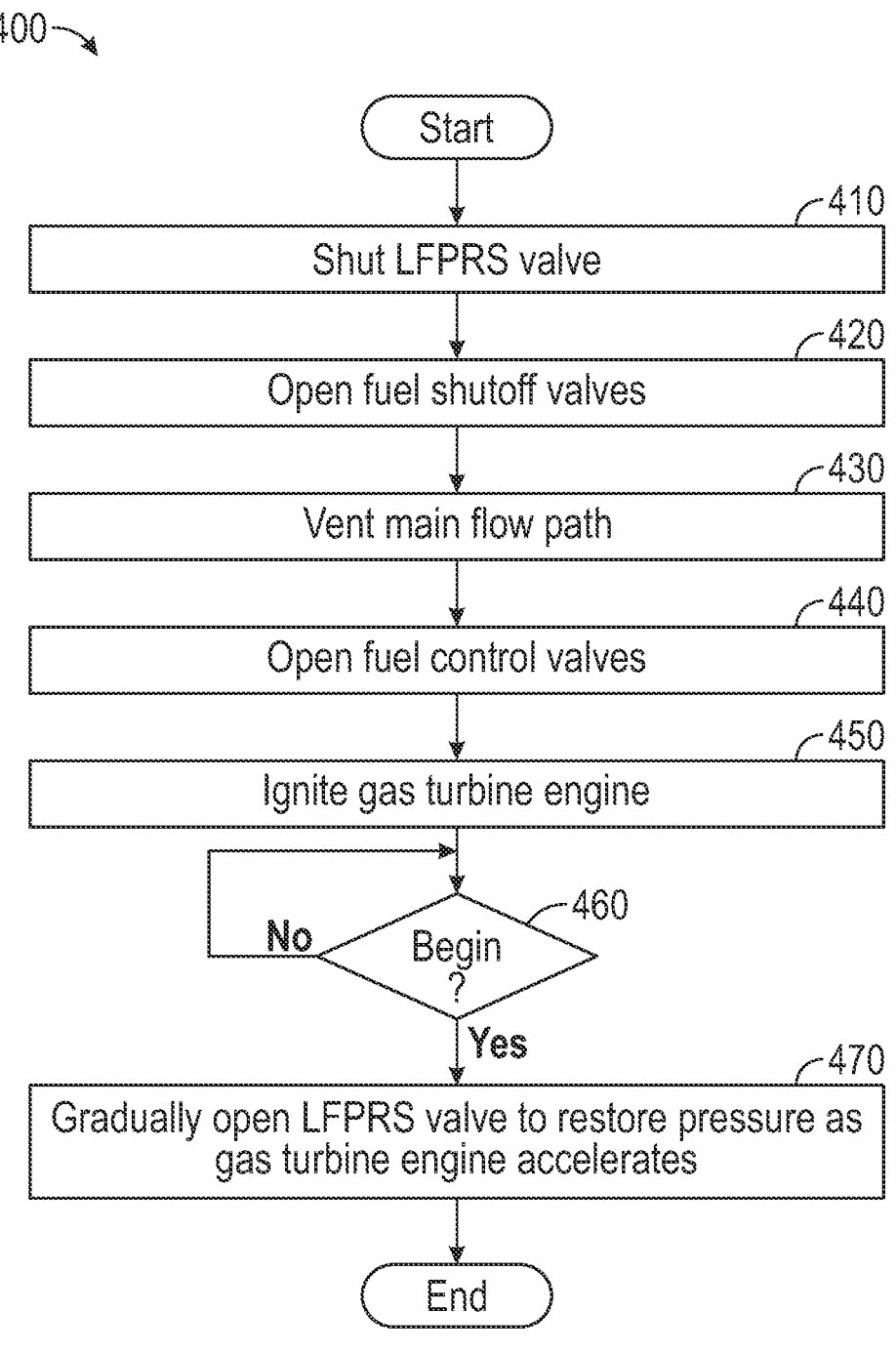
FIG. 4 illustrates a control process for lightoff fuel pressure reduction, according to an embodiment.

FIG. 4 illustrates a control process 400 for lightoff fuel pressure reduction, according to an embodiment. While process 400 is illustrated with a certain arrangement and ordering of subprocesses, process 400 may be implemented with fewer, more, or different subprocesses and a different arrangement and/or ordering of subprocesses. Thus, for example, one or more of the described subprocesses may be omitted, including any subprocess that pertains to a component that is omitted from the lightoff fuel pressure reduction system 200 being controlled by process 400. In addition, it should be understood that any subprocess, which does not depend on the completion of another subprocess, may be executed before, after, or in parallel with that other independent subprocess, even if the subprocesses are described or illustrated in a particular order.

Initially, LFPRS system 200 may be configured prior to operation of gas turbine engine 100. This configuration process may occur during the manufacturing, assembly, setup, or other process. During the configuration process, pressure reducing regulator 220 is set to reduce the fuel pressure of fuel, flowing through bypass flow path 225, to the ignition pressure (e.g., 100 psig). Pressure reducing regulator 220 may be set by: (1) opening components downstream from pressure reducing regulator 220 (e.g., fuel shutoff valve(s) 240, fuel control valve(s) 250, etc.); (2) closing LFPRS valve 210; (3) introducing pressure upstream of LFPRS system 200 (e.g., by opening upstream components); (4) opening and closing downstream component(s) several times to ensure satisfactory operation of LFPRS system 200; (5) and with downstream component(s) open, slowing adjusting pressure reducing regulator 220 (e.g., by adjusting a mechanical screw on the top of the regulator dome of pressure reducing regulator 220, for example, clockwise to increase pressure and counterclockwise to decrease pressure) until the desired pressure is output by pressure reducing regulator 220. Thus, pressure reducing regulator 220 is pre-configured to reduce the fuel pressure to the ignition pressure during ignition of gas turbine engine 100.

In subprocess 410, LFPRS valve 210 is switched to the closed state. Simultaneously or contemporaneously, in subprocess 420, fuel shutoff valve(s) 240 are switched to the open state.

Figure 5:
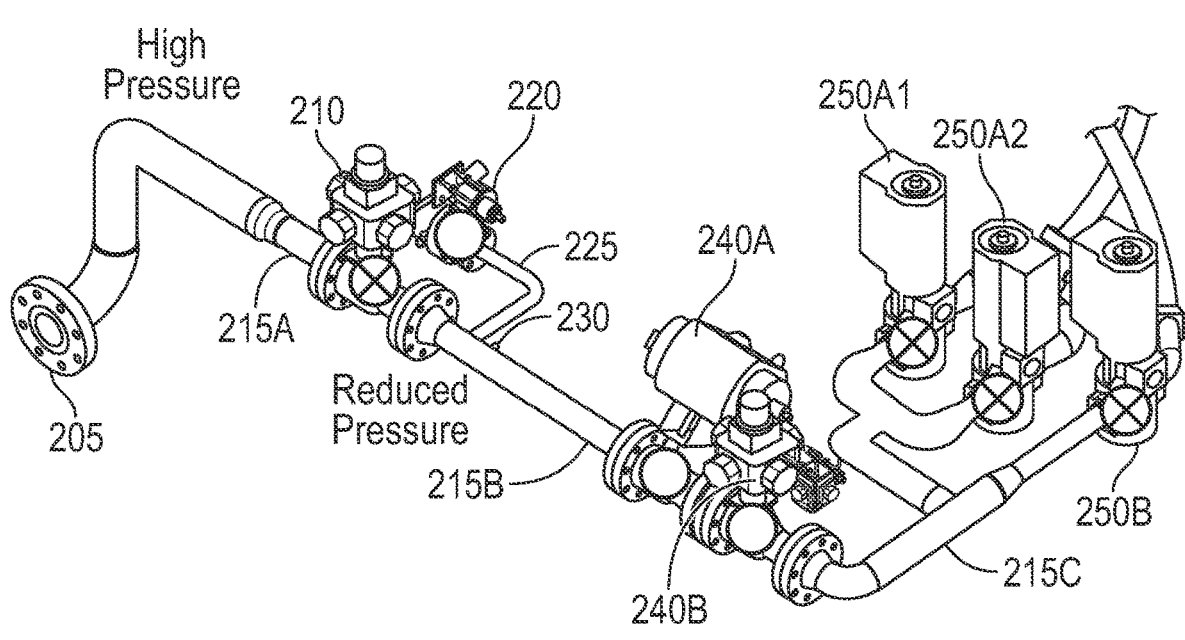
FIGS. 5-8 illustrate valve positions during the control process for lightoff fuel pressure reduction, according to an embodiment.

FIG. 5 illustrates the positions of each of the valves after subprocesses 410 and 420, according to an embodiment. In particular, pressure reducing regulator 220 and fuel shutoff valves 240A and 240B are open, whereas LFPRS valve 210, main fuel control valves 250A1 and 250A2, and pilot fuel control valve 250B are all closed. In this configuration, the fuel pressure in segment 215A (i.e., between inlet 205 and LFPRS valve 210) will have the relatively high fuel operational pressure supplied by the skid of gas turbine engine 100 (e.g., 575 psig) to inlet 205, whereas the fuel pressure in segments 215B and 215C (i.e., between LFPRS valve 210 and fuel control valves 250) will have a lower or reduced fuel pressure (e.g., less than 575 psig).

Figure 6:
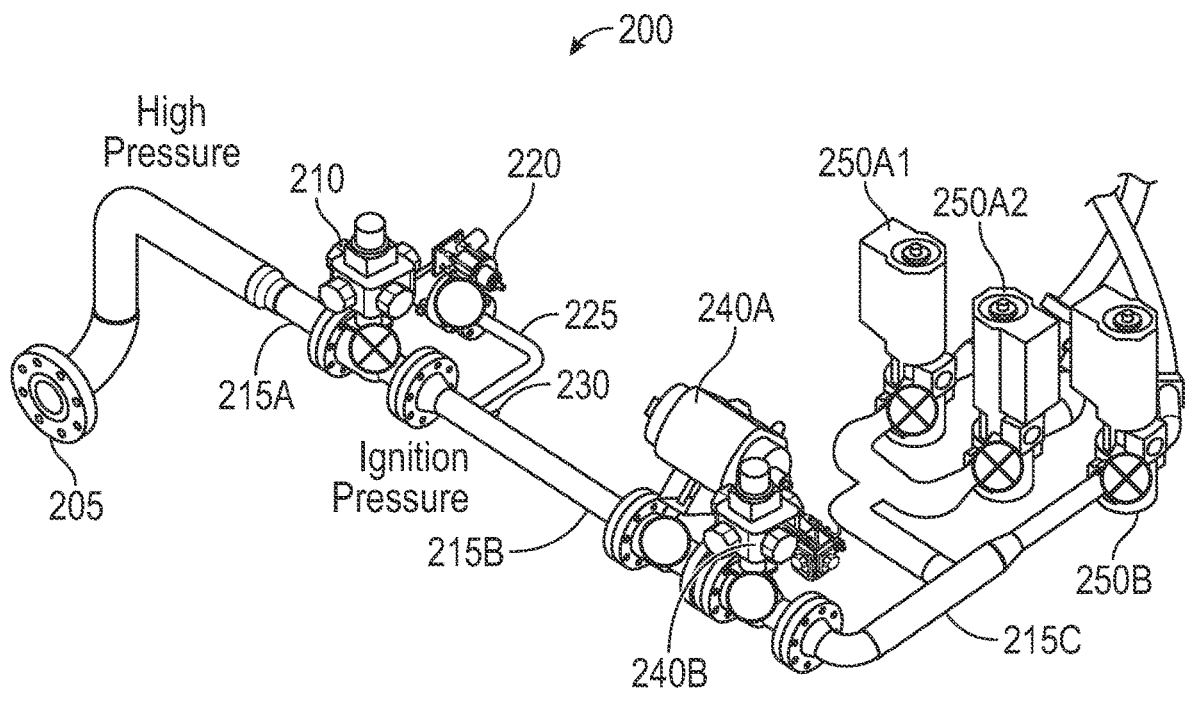

In subprocess 430, vent 230 is switched to the open state to vent fuel from main flow path 215 until the fuel pressure in segments 215B and 215C reaches the ignition pressure. Once the ignition pressure is reached, vent 230 may be switched to the closed state. As illustrated in FIG. 6, in this configuration, the fuel pressure in segment 215A will have the relatively high operational pressure, whereas the fuel pressure in segments 215B and 215C will have the relatively low ignition pressure (e.g., 100 psig) provided by pressure reducing regulator 220.

Figure 7:
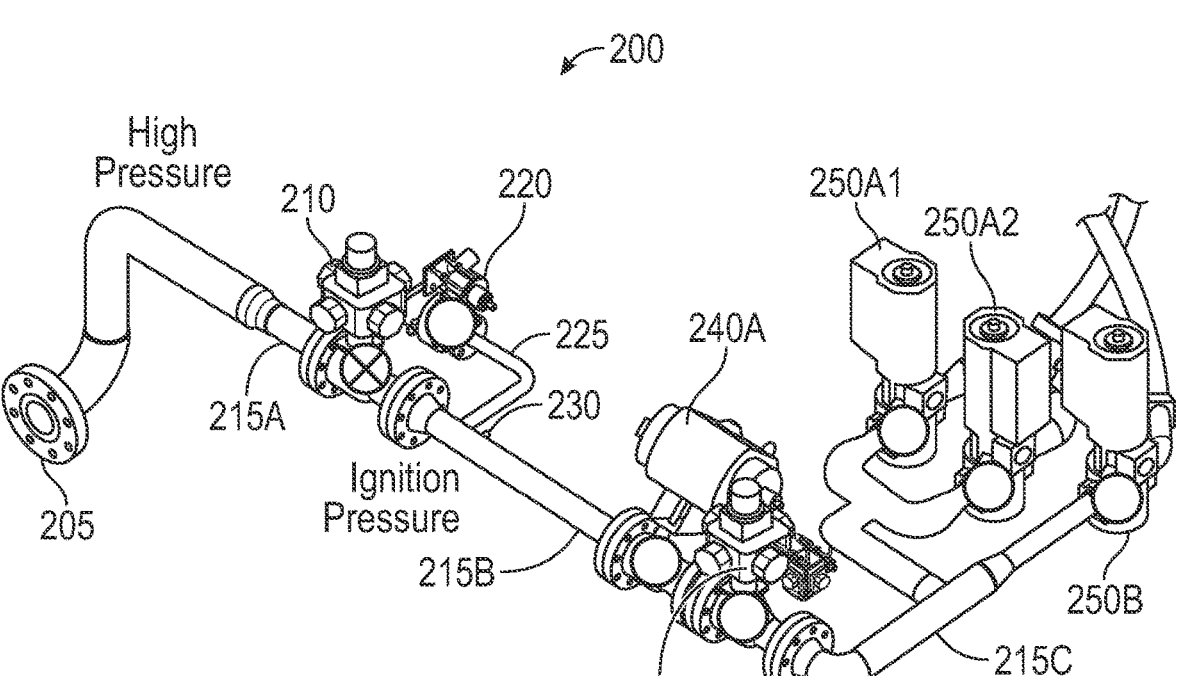

In subprocess 440, fuel control valve(s) 250 are switched to the open state. FIG. 7 illustrates the positions of each of the valves after subprocess 440, according to an embodiment. In particular, pressure reducing regulator 220, fuel shutoff valves 240A and 240B, main fuel control valves 250A1 and 250A2, and pilot fuel control valve 250B are all open, whereas LFPRS valve 210 remains closed. In this configuration, the fuel pressure in segment 215A will have the relatively high operational pressure, whereas the fuel pressure in the entire downstream portion of main flow path 215, from LFPRS valve 210 to inlet(s) 270 of fuel injector(s) 134, will have the relatively low ignition pressure (e.g., 100 psig).

In subprocess 450, gas turbine engine 100 is ignited. In other words, combustion is initiated within combustor 130, for example, using a pilot flame to ignite the pilot fuel being injected by fuel injector(s) 134. Notably, at the time of ignition, the fuel pressure is equal to the ignition pressure. Thus, gas turbine engine 100 can be reliably started.

In subprocess 460, it is determined whether or not to begin transitioning from the ignition pressure to the operational pressure for gas turbine engine 100. When determining to begin the transition (i.e., "Yes" in subprocess 460), process 400 proceeds to subprocess 470. Otherwise, when not determining to begin the transition (i.e., "No" in subprocess 460), process 400 continues to wait. The determination in subprocess 460 may be based on one or more parameters of gas turbine engine 100, such as the engine speed of gas turbine engine 100. For example, as long as the engine speed remains below a predefined threshold, subprocess 460 may determine not to begin the transition (i.e., "No" in subprocess 460). Conversely, as soon as the engine speed reaches or exceeds the predefined threshold, subprocess 460 may determine to begin the transition (i.e., "Yes" in subprocess 460). The predefined threshold may be defined as a percentage (e.g., 30%-60%) of the full engine speed.

In subprocess 470, LFPRS valve 210 is gradually transitioned from the closed state to the open state, to restore the fuel pressure in the entirety of main flow path 215 from the ignition pressure (e.g., 100 psig) to the operational pressure for gas turbine engine 100 (e.g., 575 psig). LFPRS valve 210 may be gradually opened based on the real-time speed of gas turbine engine 100. For example, as the engine speed increases, LFPRS valve 210 may be opened to increase the fuel pressure in main flow path 215, until the operational pressure is reached. In particular, when gas turbine engine 100 reaches a predefined engine speed, LFPRS valve 210 may be controlled to begin opening. Valve timing orifice 214 ensures that LFPRS valve 210 switches in a gradual manner between the closed state and the open state.

Figure 8:
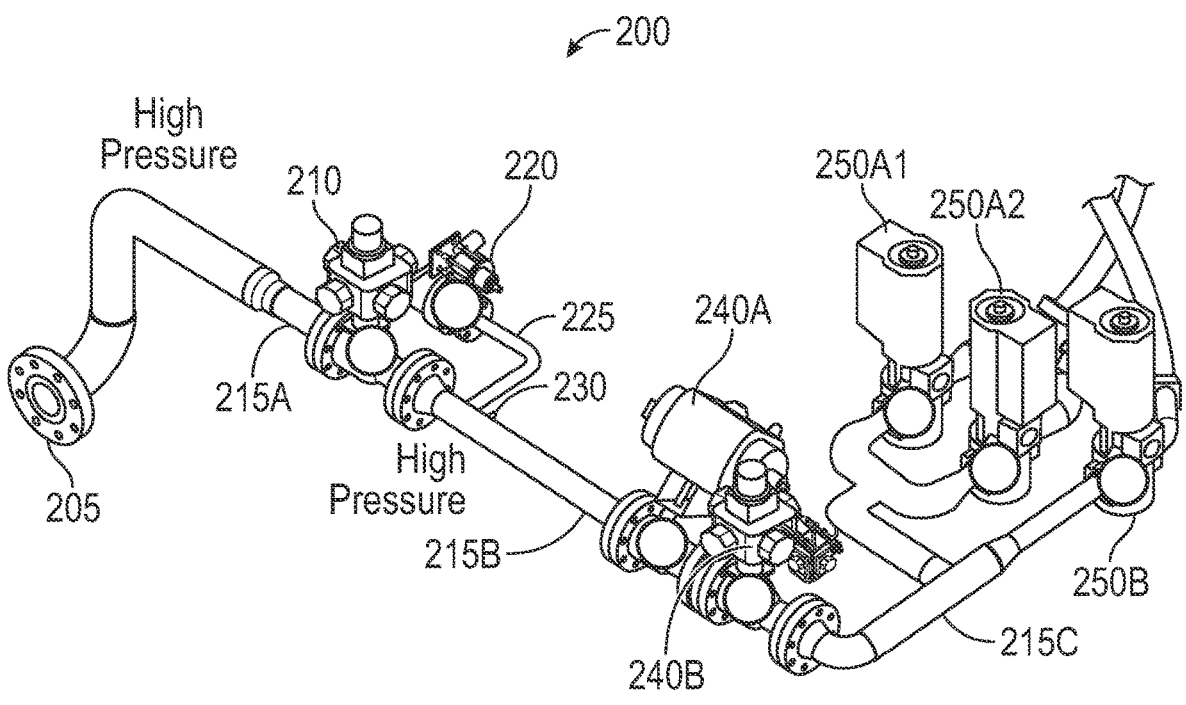

FIG. 8 illustrates the positions of each of the valves after subprocess 470, according to an embodiment. In particular, all of the valves are open. In this configuration, the fuel pressure throughout the entirety of main flow path 215 will be at the operational pressure (e.g., 575 psig).

Figure 9:
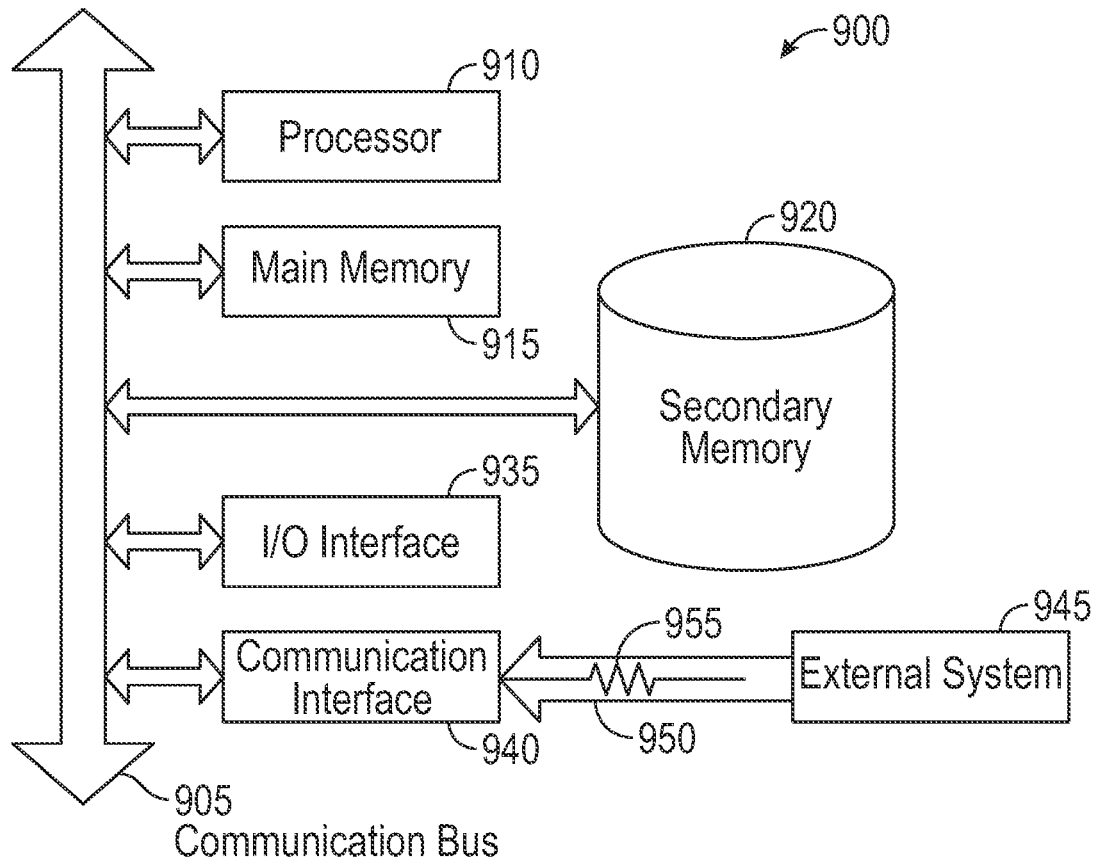
FIG. 9 illustrates an example processing system that may be used to implement the control process for lightoff fuel pressure reduction, according to an embodiment.

FIG. 9 illustrates an example processing system 900 that may be used to control one or more of the components of lightoff fuel pressure reduction system 200 and/or the overall system, according to an embodiment. For example, processing system 900 may be communicatively coupled to an actuator of solenoid 212 to control LFPRS valve 210, an actuator of pressure reducing regulator 220, an actuator of vent 230, an actuator of each fuel shutoff valve 240, an actuator of each fuel control valve 250, and/or the like. As an example, processing system 900 may receive one or more parameters or control signals, and control the actuator of any of the disclosed valves to transition between open and closed states, based on the parameter(s) and/or control signal(s). Parameter(s) may be received from one or more sensors (e.g., pressure transmitters, resistance temperature detectors, engine speed sensor, etc.), installed at position(s) along main flow path 215 and/or bypass flow path 225 and/or elsewhere within gas turbine engine 100. Control signal(s) may be received from one or more other control systems of gas turbine engine 100. Each controlled component may comprise its own processing system 900, or a single processing system 900 may control all components or any subset of components described herein.

System 900 may comprise one or more processors 910. Processor(s) 910 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 910. Examples of processors which may be used with system 900 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 910 may be connected to a communication bus 905. Communication bus 905 may include a data channel for facilitating information transfer between storage and other peripheral components of system 900. Furthermore, communication bus 905 may provide a set of signals used for communication with processor 910, including a data bus, address bus, and/or control bus (not shown). Communication bus 905 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 900 may comprise main memory 915. Main memory 915 provides storage of instructions and data for programs executing on processor 910, such as one or more of the control functions discussed herein. It should be understood that programs stored in the memory and executed by processor 910 may be written and/or compiled according to any suitable language, including without limitation C/C++, Java, JavaScript, Perl, Python, Visual Basic, .NET, and the like. Main memory 915 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 900 may comprise secondary memory 920. Secondary memory 920 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 900. The computer software stored on secondary memory 920 is read into main memory 915 for execution by processor 910. Secondary memory 920 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

System 900 may comprise an input/output (I/O) interface 935. I/O interface 935 provides an interface between one or more components of system 900 and one or more input and/or output devices. For example, I/O interface 935 may receive the output of one or more sensors, and/or output control signals to one or more of the components described herein.

System 900 may comprise a communication interface 940. Communication interface 940 allows signals, such as data and software, to be transferred between system 900 and external devices, networks, or other information sources. For example, computer-executable code and/or data may be transferred to system 900, over one or more networks, from a network server via communication interface 940. Examples of communication interface 940 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 900 with a network or another computing device. Communication interface 940 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 940 is generally in the form of electrical communication signals 955. These signals 955 may be provided to communication interface 940 via a communication channel 950 between communication interface 940 and an external system 945. In an embodiment, communication channel 950 may be a wired or wireless network, or any variety of other communication links. Communication channel 950 carries signals 955 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 915 and/or secondary memory 120. Computer-executable code can also be received from an external system 945 via communication interface 940 and stored in main memory 915 and/or secondary memory 920. Such computer-executable code, when executed by processor(s) 910, enable system 900 to perform the various control functions of the disclosed embodiments.

INDUSTRIAL APPLICABILITY

Traditionally, during ignition of a gas turbine engine, the fuel control valves are controlled to be nearly closed, in order to provide the small amount of fuel that is necessary to ignite the gas turbine engine. However, small openings through the fuel control valves are associated with high errors in the amount of fuel that is provided to the fuel injectors. As a result, too little or too much fuel may be provided during ignition, which can result in a higher likelihood of start-up failures.

Accordingly, during ignition, the disclosed lightoff fuel pressure reduction system 200 temporarily reduces fuel pressure in the main flow path 215, between LFPRS valve 210 and fuel control valve(s) 250, using a pressure reducing regulator 220 on a parallel bypass flow path 225. In particular, LFPRS valve 210 is closed, pressure reducing regulator 220 is controlled, and vent 230 is used to reduce the downstream fuel pressure in main flow path 215 to a desired ignition pressure, such that fuel control valve(s) 250 can more accurately meter fuel during ignition. This decreases the likelihood of start-up failure in gas turbine engine 100.

Once gas turbine engine 100 has successfully passed through the ignition phase into the acceleration phase, lightoff fuel pressure reduction system 200 may gradually transition LFPRS valve 210 to the open state. This gradual transition builds up the fuel pressure, supplied to fuel injector(s) 134 through fuel control valve(s) 250, until the operational pressure is reached.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of turbomachine. Hence, although the present embodiments are, for convenience of explanation, depicted and described as being implemented in a gas turbine engine, it will be appreciated that it can be implemented in various other types of engines and machines with engines, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

The invention claimed is:

1. A system for delivering fuel to one or more fuel injectors, the system comprising:
   at least one main fuel control valve and a pilot fuel control valve which supply fuel to the one or more fuel injectors;
   a lightoff fuel pressure reduction system (LFPRS) valve on a main flow path, between an inlet and the at least one main fuel control valve and the pilot fuel control valve, wherein the LFPRS valve is configured to switch between an open state, in which fuel can flow downstream through the LFPRS valve, and a closed state in which fuel cannot flow downstream through the LFPRS valve;
   a processing system configured to control the LFPRS valve to transition between open and closed states;
   a pressure reducing regulator, connected in parallel to the LFPRS valve, on a bypass flow path between the inlet and the at least one main fuel control valve and the pilot fuel control valve, wherein the pressure reducing regulator is configured to reduce a fuel pressure of fuel flowing through the pressure reducing regulator; and
   a vent between the LFPRS valve and the at least one main fuel control valve and the pilot fuel control valve.

2. The system of claim 1, further comprising one or more fuel shutoff valves between the vent and the at least one main fuel control valve and the pilot fuel control valve, wherein each of the one or more fuel shutoff valves is configured to switch between an open state, in which fuel can flow downstream through the fuel shutoff valve, and a closed state in which fuel cannot flow downstream through the fuel shutoff valve.

3. The system of claim 2, wherein the one or more fuel shutoff valves comprise at least two fuel shutoff valves.

4. The system of claim 1, wherein the at least one main fuel control valve is at least two main fuel control valves.

5. The system of claim 1, wherein the LFPRS valve comprises a ball valve.

6. The system of claim 5, wherein the ball valve is actuated by a solenoid.

7. The system of claim 6, wherein the LFPRS valve further comprises a valve timing orifice, downstream from the solenoid, that limits a speed at which the ball valve can transition from the closed state to the open state.

8. A method of using the system of claim 1, the method comprising, during an ignition phase:
   shutting the LFPRS valve;
   venting a portion of the main flow path that is downstream from the LFPRS valve using the vent;
   opening the at least one main fuel control valve and the pilot fuel control valve; and
   igniting a combustion process in a combustor of a gas turbine engine using the one or more fuel injectors.

9. The method of claim 8, wherein the system further comprises one or more fuel shutoff valves between the vent and the at least one main fuel control valve and the pilot fuel control valve, and wherein the method further comprises, during the ignition phase, opening the one or more fuel shutoff valves when shutting the LFPRS valve.

10. The method of claim 8, further comprising:

after igniting the combustion process, determining when to begin an acceleration phase; and when determining to begin the acceleration phase, opening the LFPRS valve.

11. The method of claim 10, wherein determining when to begin the acceleration phase comprises determining to begin the acceleration phase when an engine speed of the gas turbine engine reaches a predefined threshold.

12. The method of claim 10, wherein opening the LFPRS valve comprises gradually opening the LFPRS valve according to at least one parameter.

13. The method of claim 12, wherein the at least one parameter comprises an engine speed of the gas turbine engine.

14. A gas turbine engine comprising:

a compressor;

a combustor downstream from the compressor, wherein the combustor comprises the one or more fuel injectors;

the system of claim 1 positioned, relative to fuel flow, between the inlet and the one or more fuel injectors; and a turbine downstream from the combustor.

15. A system for delivering fuel in a gas turbine engine, the system comprising:

an inlet;

a pilot fuel control valve which controls an amount of fuel flowing to a pilot manifold;

a main fuel control valve which controls the amount of fuel flowing to a main manifold;

a lightoff fuel pressure reduction system (LFPRS) valve on a main flow path, between the inlet and the pilot fuel control valve and the main fuel control valve, wherein the LFPRS valve is configured to switch between an open state, in which fuel can flow downstream through the LFPRS valve, and a closed state in which fuel cannot flow downstream through the LFPRS valve;

a processing system configured to control the LFPRS valve to transition between open and closed states;

a pressure reducing regulator, connected in parallel to the LFPRS valve, on a bypass flow path between the inlet and the pilot fuel control valve and the main fuel control valve, wherein the pressure reducing regulator is configured to reduce a fuel pressure of fuel flowing through the pressure reducing regulator;

a vent between the LFPRS valve and the pilot fuel control valve and the main fuel control valve; and one or more fuel shutoff valves between the vent and the pilot fuel control valve and the main fuel control valve, wherein each of the one or more fuel shutoff valves is configured to switch between an open state, in which fuel can flow downstream through the one or more fuel shutoff valves, and a closed state in which fuel cannot flow downstream through the one or more fuel shutoff valves.

16. The system of claim 15, wherein the LFPRS valve is a ball valve, actuated by a solenoid, and wherein a valve timing orifice, downstream from the solenoid, limits a speed at which the ball valve can transition between the closed state and the open state.

17. A method of starting a gas turbine engine having a combustor, the method comprising, during an ignition phase:

shutting a lightoff fuel pressure reduction system (LFPRS) valve, on a main flow path between an inlet and a pilot fuel control valve which controls an amount of fuel flowing to a pilot manifold and a main fuel control valve which controls the amount of fuel flowing to a main manifold, based on a transition of the LFPRS valve between open and closed states, wherein the LFPRS valve is connected in parallel to a pressure reducing regulator on a bypass flow path between the inlet and the pilot fuel control valve and the main fuel control valve, wherein the pressure reducing regulator is configured to reduce pressure in a portion of the main flow path that is downstream from the LFPRS valve to an ignition pressure;

decreasing the pressure in the portion of the main flow path that is downstream from the LFPRS valve;

opening the pilot fuel control valve and the main fuel control valve; and igniting a combustion process in the combustor using one or more fuel injectors.

18. The method of claim 17, further comprising:

after igniting the combustion process, determining when to begin an acceleration phase; and when determining to begin the acceleration phase, opening the LFPRS valve.

19. The method of claim 18, wherein opening the LFPRS valve comprises gradually opening the LFPRS valve when the gas turbine engine reaches a predefined engine speed.

20. The system of claim 1, wherein the processing system is further configured to control an actuator of the vent to transition the vent between an open state and a closed state.

* * * * *